No. 730,630. Patented June 9, 1903.

UNITED STATES PATENT OFFICE.

OTTO FRIZ, OF NUREMBERG, GERMANY.

MANUFACTURE OF WHITE CEMENT.

SPECIFICATION forming part of Letters Patent No. 730,630, dated June 9, 1903.

Application filed April 26, 1900. Serial No. 14,464. (No specimens.)

*To all whom it may concern:*

Be it known that I, OTTO FRIZ, a subject of the German Emperor, residing at Nuremberg, Germany, have invented certain new and useful Improvements in the Manufacture of White Cement, of which the following is a specification.

In Letters Patent of the United States granted me April 22, 1902, No. 698,268, I have described a process for manufacturing cement in which feldspar plays the part both of a flux and a means for introducing silicic acid. In said process a clay which is free from iron (kaolin, pipe-clay, and the like) is mixed with feldspar, (orthoclase or equivalent,) which is also as free as possible from iron, and with lime, likewise as free from iron as possible. This mixture is then burned to the fusing-point—that is, beyond the sintering limit. I have discovered that artificial components will lead to the same result if only they serve likewise as feeders of silicic acid and as a flux. For this purpose porcelain frits and glasses formed of alkalies and silicic acid, alkaline earths and silicic acid, with or without clay, may be substituted for feldspar and perform its dual office.

As a type of the acid silicate frits, by which I mean frits having a surplus of silicate, which is necessary to my purpose, I name porcelain, to wit: a porcelain frit made from quartz, kaolin, feldspar—that is, silica, clay, alkali—which is used in the present process in the form of waste shards. I may use as a type of glasses ordinary glass, as a mixture of silica, alkali, and calcareous earth brought to fusion, allowed to harden, and used in the form of glass shards. The frits or the potsherds of glass will be mixed with the iron-free clay and iron-free lime in such proportions as to moderate the over-high sintering degree of these two bodies and to add so much silicic acid to the mixture as is imperatively necessary for a normally hardening Portland cement. The proportions will depend upon the composition of the kaolin used relatively to the somewhat fluctuating composition of the porcelain frits or glass potsherds, but must be such that the proportions in the prepared cement will be CaO to $(SiO_2+Al_2O_3)$, approximately as two to one. $SiO_2$ to $Al_2O_3$, likewise approximately as two to one. It is not possible to give an absolutely-definite chemical formula, since none such exists. The various materials after being reduced to the finest condition possible are intimately mixed, either dry or wet, the mass pressed into suitable blocks, burned to the commencement of the fusing-point, and the clinkers produced pulverized to the fineness of flour.

I claim—

The process of manufacturing white cement consisting in preparing a mixture of lime and clay, both as free as possible from iron, with porcelain frits and burning said mixture approximately to the fusing-point.

In testimony whereof I affix my signature in presence of two witnesses.

OTTO FRIZ.

Witnesses:
BERNHARD BATTY,
OSCAR BOCK.